United States Patent [19]

Müller

[11] Patent Number: 5,657,615
[45] Date of Patent: Aug. 19, 1997

[54] SPACING CONVEYOR MECHANISM

[75] Inventor: Rolf Müller, Mehring, Germany

[73] Assignee: Riverwood International Corporation, Atlanta, Ga.

[21] Appl. No.: 545,897

[22] Filed: Oct. 20, 1995

[30] Foreign Application Priority Data

Oct. 20, 1994 [GB] United Kingdom ............ 9421177

[51] Int. Cl.[6] .......................................... B65B 35/30
[52] U.S. Cl. .......................... 53/448; 53/48.7; 53/543; 53/531; 53/443; 198/419.3; 198/604; 198/626.5; 198/797
[58] Field of Search .................. 53/48.7, 251, 252, 53/534, 542, 543, 531, 443, 448; 198/419.2, 419.3, 626.1, 626.5, 604, 797, 798, 799

[56] References Cited

U.S. PATENT DOCUMENTS

| 2,242,813 | 5/1941 | Cook | 198/798 X |
|---|---|---|---|
| 2,608,287 | 8/1952 | Mahoney et al. | 198/798 X |
| 3,019,886 | 2/1962 | Winkler et al. | 53/542 X |
| 3,108,682 | 10/1963 | Zipper | 198/626.1 |
| 3,194,381 | 7/1965 | Sherman | 198/419.3 |
| 3,648,431 | 3/1972 | Hartbauer et al. | 53/139.3 X |
| 4,078,357 | 3/1978 | Ida | 53/543 X |
| 4,100,715 | 7/1978 | Ganz | 53/49 X |
| 4,591,043 | 5/1986 | Muller | 198/419.3 |
| 5,012,916 | 5/1991 | Craver | 198/419.3 |
| 5,501,064 | 3/1996 | Ingram et al. | 53/252 X |

FOREIGN PATENT DOCUMENTS

| 0 060 720 | 9/1982 | European Pat. Off. . |
|---|---|---|
| 0 126 553 | 11/1984 | European Pat. Off. . |
| 0450915 | 10/1991 | European Pat. Off. . |
| 2 052 128 | 4/1971 | France . |
| 38 39 498 | 5/1990 | Germany . |

Primary Examiner—Daniel Moon
Attorney, Agent, or Firm—Isaf, Vaughan & Kerr

[57] ABSTRACT

There is provided a spacing conveyor mechanism 10 having a pair of spaced, identical drive chains 13, 14. A number of conveyors 20 are attached to the chains, each conveyor having a leading carriage 21 pivotally attached to one chain 13 and a trailing carriage 22 pivotally attached to the other chain 14. Connecting the each pair of leading/trailing carriages is a pair of rod 23 extending rearwardly from the leading carriage through corresponding holes in the trailing carriage. The carriages remain parallel throughout their path and the position of the carriages relative to each other are easily adjusted.

7 Claims, 3 Drawing Sheets

SPACING CONVEYOR MECHANISM

BACKGROUND OF THE INVENTION

This invention relates to spacing conveyor mechanisms for article packaging machines and in particular but not exclusively for can or bottle multipack packaging machines.

SUMMARY OF THE INVENTION

According to a first aspect of the present invention there is provided a spacing conveyor mechanism for an article packaging machine having an article feed path, said mechanism comprising a number of article conveyors mounted on a drive assembly for movement in a circuitous path, a part of which is in use adjacent the feed path of the articles and during which part of its path each conveyor engages the articles in the feed path, the drive assembly comprising upper and lower endless drives having identical but longitudinally offset paths, each conveyor comprising a leading carriage pivotally attached to the forwardmost drive and a trailing carriage pivotally attached to the rearmost drive at a corresponding location, a guide member extending from one carriage of a conveyor and slidingly received within the other carriage of said conveyor, and said upper and lower drives being movable longitudinally relative to each other so as to vary the offset, which movement results in the two carriages of each conveyor moving relative to each other, the conveyors remaining substantially parallel to each other throughout their circuitous path.

Preferably, each leading carriage when adjacent the feed path constitutes a leading stop for a group of articles and the trailing carriage constitutes a rear stop for the group of articles. A further preferred feature is that the leading stop has an angled rear face and the rear stop has an angled leading face, both angled faces facing towards the article feed path.

In preferred embodiments the upper and lower drives comprise endless chains, each meshing with a pair of spaced sprockets, one sprocket of each drive being driven.

Conveniently, the driven sprockets are driven by a single drive mechanism utilising universal couplings to allow for the relative movement between the chains.

In one arrangement, the upper chain is the forwardmost chain.

In a chosen arrangement, the guide member comprises one or more rods bolted to the leading carriage of each conveyor and extending through one or more corresponding apertures in the rear carriage.

According to a second aspect of the present invention, there is provided a spacing conveyor arrangement comprising two such spacing conveyor mechanisms located parallel to each other on either side of an article feed path, each set of article conveyors in use engaging separate lines of articles.

An embodiment of the present invention will now be described in more detail. The description makes reference to the accompanying drawings,

DETAILED DESCRIPTION

In the Figures there is shown a spacing conveyor mechanism 10 for a packaging machine. The embodiment shown is for spacing and conveying multiples of cans or bottles 9. Other articles could however replace the cans or bottles 9. The mechanism 10 is, in use, positioned adjacent a feed path 11 defined by a moving belt, for example, which conveys the cans or bottles in groups to an area (not shown) where they are automatically packed into boxes, sleeves, etc. A feed mechanism (not shown) which may be in the form of a star wheel arrangement feeds cans or bottles to the mechanism 10 at a rate equal to the rate required. The mechanism 10 groups the cans or bottles on to a conveyor means, such as the moving belt, which transports the groups to the packing section of the packaging machine. Quite frequently a similar mechanism 10 will be provided in parallel so as to space and convey articles in one or two rows, the moving belt having space for said row or rows of articles to pass between the two mechanisms.

Figure 2:
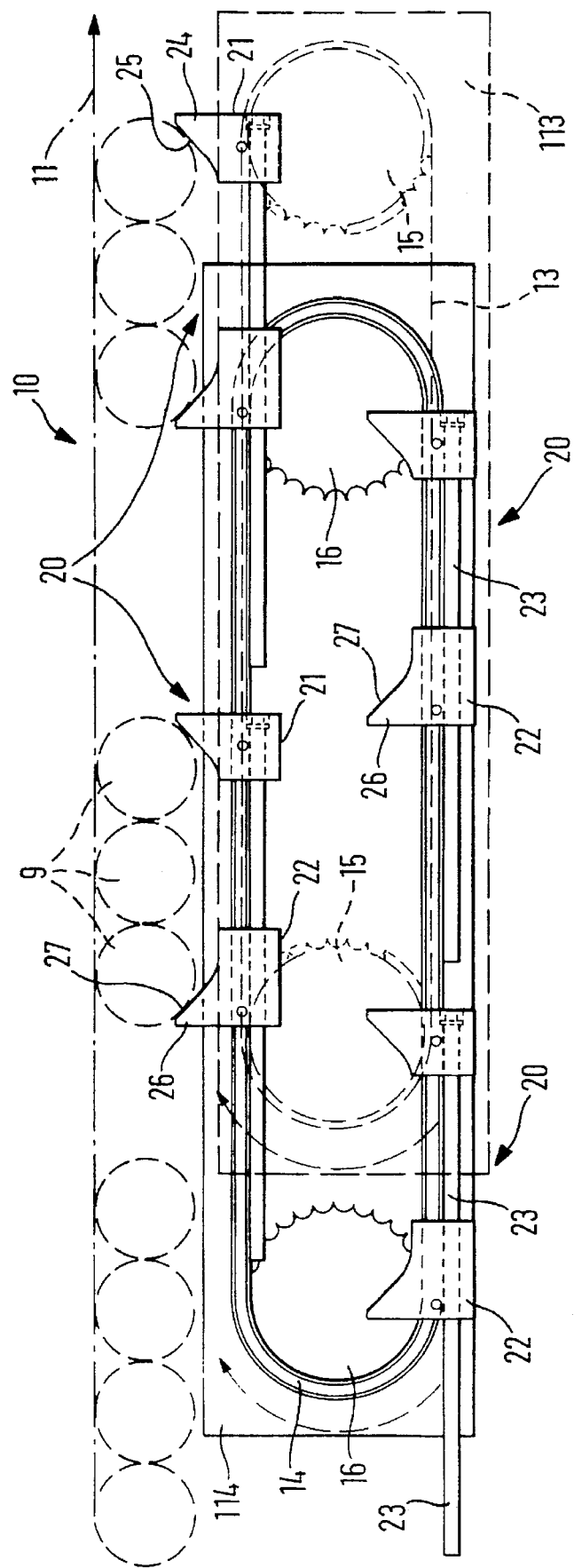
FIG. 2 is a schematic, part sectional view of the FIG. 1 arrangement in an alternative configuration.
Figure 3:
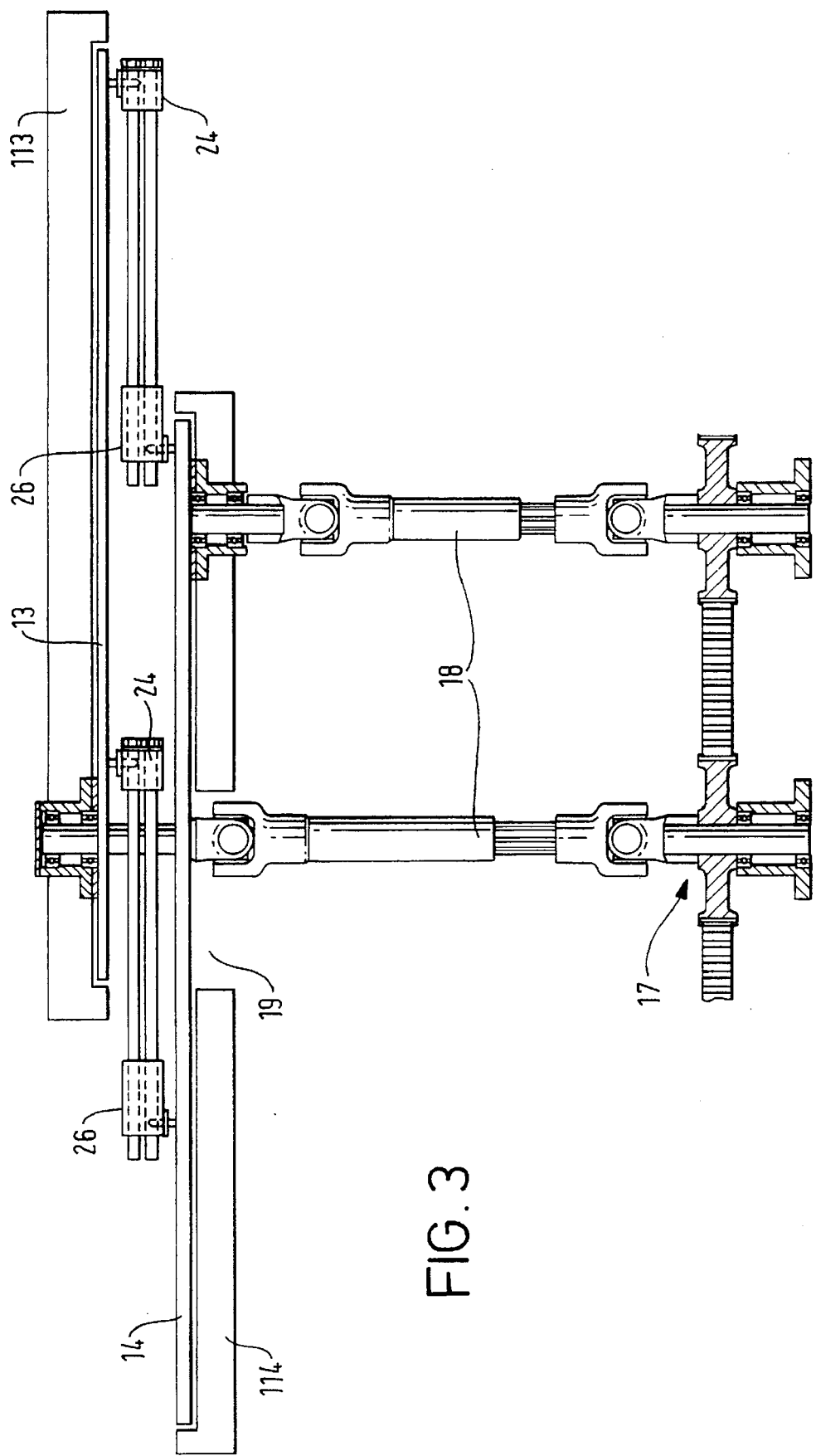
FIG. 3 is a schematic side view of the FIG. 1 arrangement, omitting articles being conveyed.

Each mechanism 10 comprises an upper endless chain 13 (indicated only as a broken line in FIGS. 1 and 2) in an upper frame 113 and a lower endless chain 14 (shown schematically in FIGS. 1 and 2) in a lower frame 114. The two chains 13, 14 are of identical shape and length but are offset in the longitudinal direction of the feed path 11. The upper chain 13 in this embodiment is also vertically spaced from the lower chain as can be seen in FIG. 3. Each chain 13, 14 extends between two sprockets 15 and two sprockets 16 respectively, only one of which for each chain is driven. The drive is by way of suitable gearing 17 and telescopic universal couplings 18 so that both chains are driven at the same speed. The two frames 113, 114 and thus the two chains 13 and 14 are movable in the longitudinal direction relative to each other so as to vary the amount of offset between the chains 13, 14. One of the drives has to extend through a suitable slot 19 in the lower chain assembly.

In the embodiment shown, four conveyors 20 are provided on the pair of chains 13, 14 at equal intervals around the chains 13, 14. To ensure smooth movement of the cans 9 through the mechanism 10, it is important that the conveyors 20 approach and separate from the cans substantially parallel to the feed path 11. The conveyors 20 are therefore kept parallel to each other all the time during their circuitous path around the chains and in particular as they approach the cans and separate from the cans 9.

In order to achieve this parallel movement, each conveyor 20 comprises a leading carriage 21 which is pivotally connected to the forwardmost upper chain 13 and a trailing carriage 22 which is pivotally connected to the lower chain 14 at a position substantially identical to the leading carriage 21 on the upper chain 13. Two straight guide bars 23 are bolted to the leading carriage 21 and extend rearwardly to the trailing carriage 22 through which the bars 23 pass. The guide bars 23 are slidingly received in bores formed in the trailing carriage 22. As the carriages 21, 22 are driven around their respective chains 13, 14 they thus remain parallel to the feed path 11.

The leading carriages 21 each incorporate a leading stop 24 having an angled trailing surface 25 and the trailing carriages 22 each incorporate a rear stop 26 having an angled forward surface 27.

As the upper and lower chains 13, 14 are driven at the same speed the leading carriages 21 and trailing carriages 22 move in synchronised fashion around the chains, retained in parallel relation facing the feed path 11 by virtue of the guide bars 23 being slidingly received in the trailing carriages 22.

Figure 1:
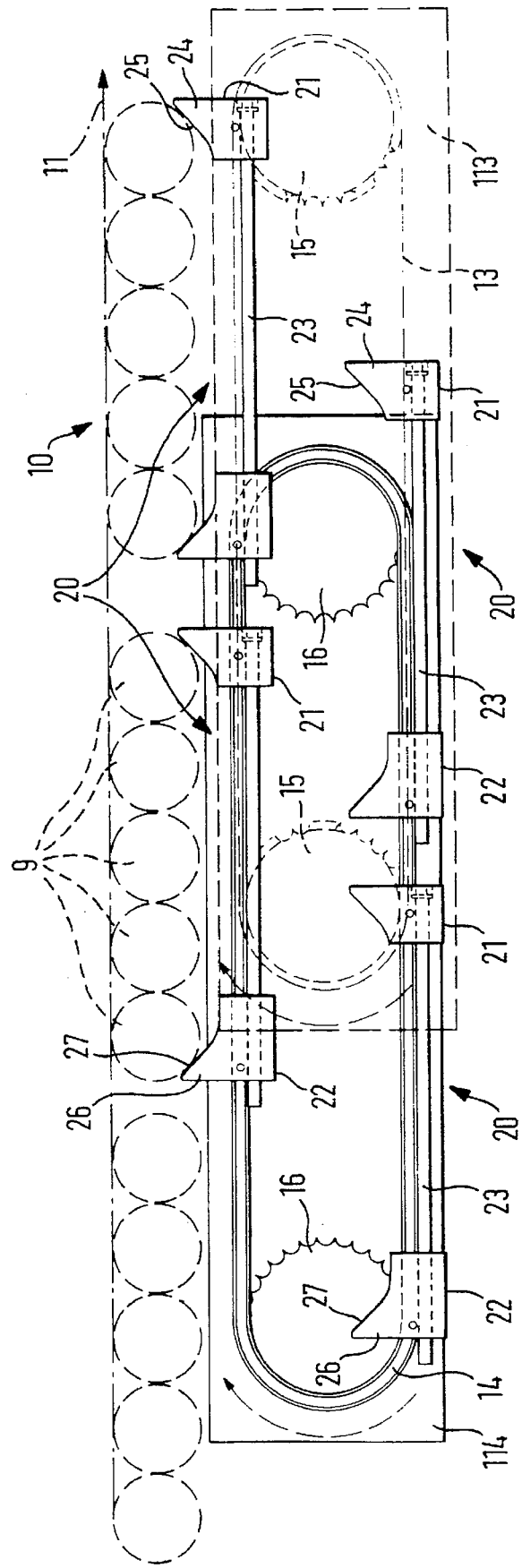
FIG. 1 is a schematic, part sectional plan view of a mechanism according to the present invention.

Clearly the distance between the leading and rear stops 24, 26 of each conveyor 20 determines how many cans or bottles 9 can be spaced and conveyed by each conveyor 20. In FIG. 1, five cans 9 are shown as being conveyed along the feed path 11 by each conveyor 20. Suitable guide assemblies (not shown) would be provided to ensure that the bottles or cans 9 do not move out of line along the feed path 11.

The drive system of the mechanism will be such that the conveyors 20 will travel at the same speed as the moving belt along the section adjacent the feed path 11. The drives for the chains 13, 14, feed mechanism (such as star wheel arrangement) and the belt may all be linked by suitable gear assemblies could be driven and controlled by separate mechanisms.

If it is desired to pack multiples of different sizes, for example three articles long as opposed to five, then the upper chain 13 and its frame 113 is moved longitudinally towards the lower chain 14 and its frame 114. The leading carriages 21 then get closer to their associated trailing carriages 22, the guide bars 23 sliding further through the trailing carriages 22. Clearly the amount of movement between the chains is such that the leading and rear stops 24, 26 are spaced apart by a length equivalent to three articles. FIG. 2 shows how the mechanism is adjustable for multipacks which are three cans long. The mechanism 10 can be adjusted to any length between the leading and rear stops 24, 26 depending on the parameters of the mechanism. Also the locations of the carriages can be changed and more conveyors 20 inserted as long as the various drive systems of the overall machinery are adjusted where necessary.

Also other guide mechanisms between the leading and rear carriages are envisaged and the actual shapes and dimensions of the stops are a matter of design choice. Although the chains move in a simple path between two sprockets, further sprockets could be inserted as desired to alter the chain path. Also other endless drives could be used instead of chains.

While a preferred embodiment of the invention has been disclosed in the foregoing specification and drawings, it will be understood by those skilled in the art that variations and modifications thereof can be made without departure from the spirit and scope of the invention as set forth in the following claims.

What is claimed is:

1. A spacing conveyor mechanism for use with a packaging machine in which a series of articles are conveyed in an article feed direction along an article feed path through the packaging machine and formed into groups for subsequent packaging, said spacing conveyor mechanism comprising:

a vertically spaced upper frame and a lower frame;

a first set of spaced sprockets attached to said upper frame;

a second set of spaced sprockets attached to said lower frame;

an upper endless chain encircling said first set of sprockets and a lower endless chain encircling said second set of sprockets, said upper and lower endless chains being vertically aligned with each other while being longitudinally offset in the article feed direction such that said chains are partially overlapping;

drive means for synchronously driving said upper endless chain and said lower endless chain in a circuitous path; and a plurality of article conveyors, each conveyor including, a leading carriage pivotally connected to said upper endless chain;

a trailing carriage having a bore defined therein and extending therethrough, said trailing carriage being pivotally connected to said lower endless chain; and a guide bar connected to said leading carriage and extending rearwardly away therefrom such that said guide bar is slidably received within said bore and is constructed and arranged to permit the longitudinal movement of said upper and lower endless chains in the article feed direction with respect to on another for varying the distance between the leading and trailing carriages so that the quantity of articles conveyed can be varied, said conveyors being disposed on said upper and lower endless chains in a substantially parallel orientation with respect to the article feed path.

2. The mechanism as claimed in claim 1 wherein said leading carriage comprises a leading stop and wherein said trailing carriage comprises a rear stop when said article conveyor is adjacent the feed path.

3. The mechanism as claimed in claim 2 wherein said leading stop has an angled trailing surface and said rear stop has an angled forward surface.

4. The mechanism as claimed in claim 1 wherein said guide bar is bolted to said leading carriage.

5. The mechanism as claimed in claim 1 wherein said drive means comprises:

a gear train; and a plurality of telescopic universal couplings each having first and second ends, said first ends being pivotally attached to one of said first set of sprockets and to one of said second set of sprockets, said second ends being pivotally attached to said gear train.

6. A spacing conveyor assembly for use with a packaging machine, the packaging machine being supplied with two spaced series of articles being generally parallel to one another and moving in an article feed direction along an article feed path extending through the packaging machine, said spacing conveyor assembly comprising:

a pair of opposed spacing conveyor mechanisms positioned adjacent at least a portion of the article feed path and extending therealong, said spacing conveyor mechanisms being generally parallel to, and spaced apart from one another;

each said spacing conveyor mechanisms including:

a vertically spaced upper frame and a lower frame;

a first set of spaced sprockets attached to said upper frame;

a second set of spaced sprockets attached to said lower frame;

an upper endless chain supported by said first set of sprockets and a lower endless chain supported by said second set of sprockets, said upper and lower endless chains being vertically aligned with each other while being longitudinally offset in the article feed direction such that said chains are partially overlapping;

drive means for synchronously driving said upper endless chain and said lower endless chain in a circuitous path;

a plurality of article conveyors, each conveyor including, a leading carriage pivotally connected to said upper endless chain;

a trailing carriage having a bore therethrough pivotally connected to said lower endless chain; and a guide bar connected to said leading carriage and extending rearward such that said guide bar is slidably received within the bore through said trailing carriage permitting longitudinal movement of said upper and lower endless chains in the article feed direction, thereby varying the distance between the leading and trailing carriages so that the quantity of articles conveyed can be varied, said conveyors being disposed on said upper and lower endless chains in a substantially parallel orientation with respect to the article feed path.

7. A method of forming a series of articles moving in an article feed direction along an article feed path extending through a packaging machine into groups of articles, said method comprising the steps of:

positioning a first and a second spaced pair of sprockets adjacent the article feed path, said first pair of sprockets being vertically spaced from said second pair of sprockets;

encircling said first pair of sprockets with an upper endless chain and encircling said second pair of sprockets with a lower endless chain, said upper and lower endless chains being vertically aligned with each other while being longitudinally offset in the article feed direction such that said chains are partially overlapping;

positioning a first elongated portion of said upper endless chain and a first elongated portion of said lower endless chain parallel to and adjacent the article feed path;

carrying a spaced series of article conveyors on said chains, each said article conveyor including a leading carriage pivotally connected to said upper endless chain, a trailing carriage having a bore defined therein and extending therethrough, said trailing carriage being pivotally connected to said lower endless chain, and a guide bar connected to said leading carriage and extending therefrom such that said guide bar is slidably received within said bore constructed and arranged to permit the longitudinal movement of said upper and lower endless chains with respect to one another in the feed path direction for varying the distance between the leading and trailing carriage so that the quantity of articles engaged can be varied;

positioning said article conveyors on said upper and lower chains in a substantially parallel orientation with respect to the article feed path;

attaching a single drive mechanism having universal couplings to one sprocket of said first pair of sprockets and to one sprocket of said second pair of sprockets;

driving said upper and lower chains synchronously along a generally circuitous path, said first elongated portion of said upper endless chain and said first elongated portion of said lower endless chain moving in the article feed direction;

maintaining each said article conveyor in said substantially parallel orientation with respect to the article feed path throughout the movement of said article conveyors along the circuitous path of said upper and lower chains; and sequentially moving each said article conveyor along said first portion of said upper and lower endless chains, engaging a plurality of the articles moving along the article feed path with said leading and trailing carriages, and forming the articles into groups of articles of a predetermined group size.

* * * * *